: 3,485,576
Patented Dec. 23, 1969

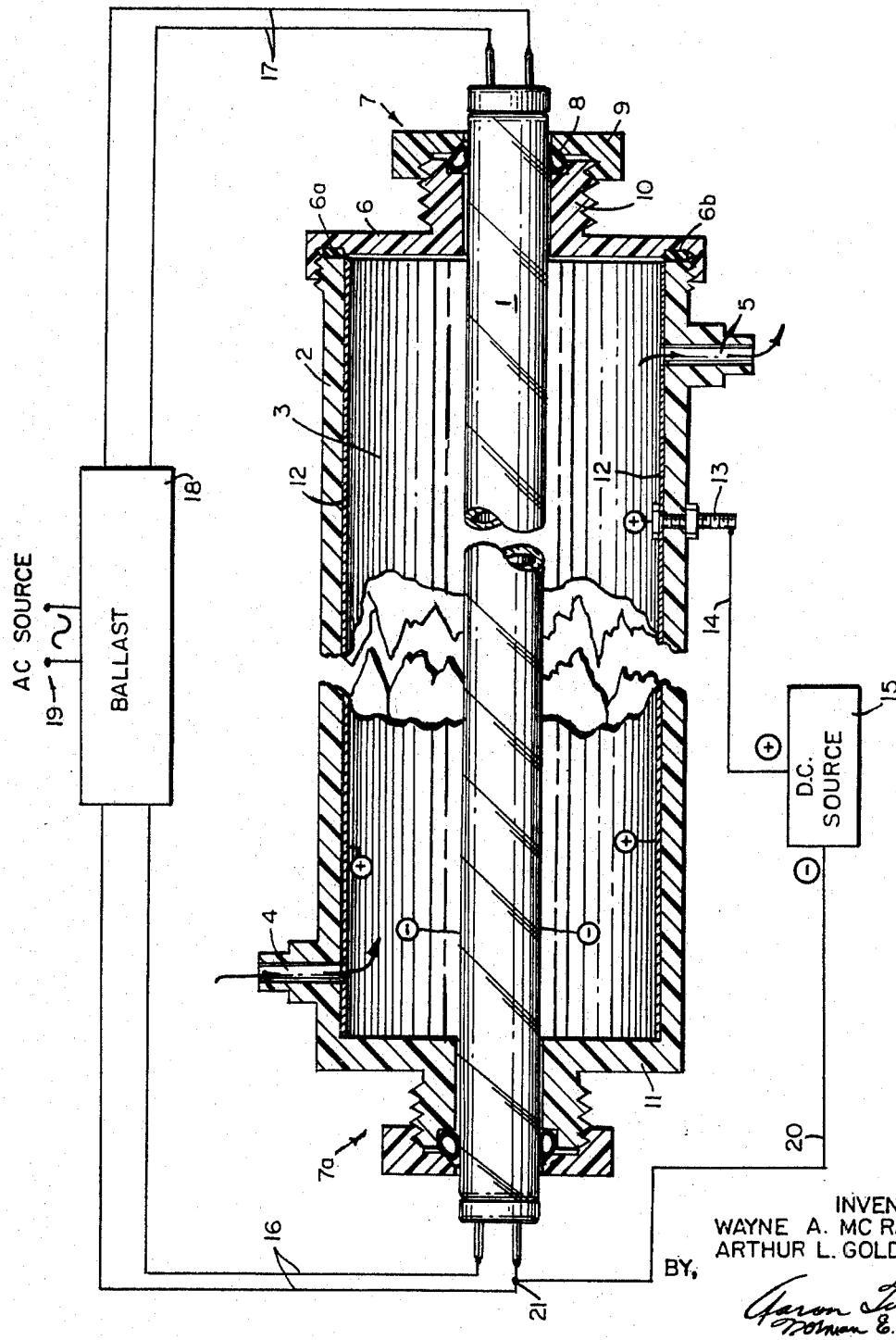

3,485,576
ULTRAVIOLET PROCESS AND APPARATUS FOR DISINFECTION OF AQUEOUS LIQUIDS
Wayne A. McRae, Lexington, and Arthur L. Goldstein, Weston, Mass., assignors to Ionics, Incorporated, Watertown, Mass.
Filed June 29, 1967, Ser. No. 650,024
Int. Cl. A61l 1/00, 3/00
U.S. Cl. 21—54                     11 Claims

ABSTRACT OF THE DISCLOSURE

The usual sliming of the outer surface of an ultraviolet lamp employed in the sterilization of water is prevented by establishing an anode grid external to said lamp but in contact with the water being treated, whereby negatively charged colloidal particles present in said water are attracted to said anode grid and deposited thereon instead of being deposited on the quartz tube of the ultraviolet lamp as a radiation insulating coating thereon.

---

This invention relates to the prevention of fouling of the outer surface of any arc or incandescent lamp radiating ultraviolet energy in the range of 1,850 to 3,150 angstroms such as the low-pressure mercury lamp, during the sterilization of liquids in contact with such lamps. More particularly, this invention is directed to the prevention of sliming of the outer surface of ultraviolet arc lamps in the sterilization of water in contact with said lamp by establishing and maintaining an anode in said water external to said lamp whereby the colloidal matter present in said water is diverted from the surface of the lamp to said external anode. In such an arrangement, the efficiency of the lamp is unimpaired in its transmission of lethal doses of ultraviolet radiation for the killing of biological organisms, including spores, virus, as well as bacteria, and other micro-organisms contained in said water.

The beneficial uses of ultraviolet energy for disinfection of water have been known for many years. The use of the broad spectrum from 1,849 to 3,130 angstroms and preferably the 2,537 angstrom line of the low-pressure mercury arc ultraviolet spectrum to sterilize water has many advantages over the use of chemical sterilizing agents, such as for example, chlorine, fatty acids, imidazolines, ozone and the like. Included in such advantages are: the taste of the product of sterilization is not affected; the mineral content of the liquid is not changed; overexposure of the water is impossible since ultraviolet radiation has no other effect than the destruction of micro-organisms; chemical corrosion of pipes and eventual plugging of the same are eliminated, and so forth.

The germicidal effect of ultraviolet energy is believed to be the result of its absorption by various organic components essential to micro-organism cell functions. Energy dissipation by excitation, causing disruption of unsaturated molecular bonds, appears to produce a progressive lethal biochemical change. For most species, the bactericidal effect is a function of wave length which is greatest at about 2,500 to 2,600 angstroms. There are other factors which affect the penetration of ultraviolet energy through liquids such as water and accordingly affect the destruction of organisms. These factors include turbidity, color elements, iron salts, presence of organic salts, ambient temperatures, and the like. These deleterious factors are minimized or overcome by many well known pretreatments.

The principle in the operation of the described device is that although the ultraviolet transmitting walls of low-pressure mercury arc lamps and other electrically driven lamps are very poor electrical conductors, nevertheless it is necessary to pass only a few microamperes (at an easily obtainable voltage) from the arc or plasma or other radiant medium in the lamp (which is a very good electrical conductor) through the walls of the lamp and the surrounding water to an external anode in contact with said water to maintain a negative charge on the walls of the lamp. Thus the colloidal particles (negatively charged in naturally occurring waters) present in the surrounding water are repelled by the negatively charged walls of the ultraviolet tube or lamp but attracted through the surrounding water to the positively charged external anode where they are in part deposited. In this situation the ultraviolet transmitting surface of the lamp is not slimed and the lethal dose of ultraviolet radiation is effective in the sterilization of the surrounding water.

Ultraviolet sterilization of water consists generally of flowing a relatively thin layer (approximately 1 to 3 inches in thickness) of water over a low pressure mercury arc lamp emitting ultraviolet radiation in the 2,537 angstrom level so that all the micro-organisms are exposed to the full radiation of said lamp. Since water absorbs ultraviolet light, substantially thicker layers of unagitated water would result in the outer layers of water not receiving sufficient radiation to kill the organisms present. In addition, it is found desirable to clarify the water by filtration before radiation to prevent micro-organisms from surviving in the micropenumbra cast by colloidal and suspended matter in the water being treated. It was also found desirable to remove soluble organic matter since most of its absorbs ultraviolet radiation thereby reducing the sterilization efficiency. However, it is found in operating an ultraviolet sterilizer that some colloidal matter in the water is not readily removed by conventional filtration and tends to coat the outer surface of the ultraviolet lamp, thus deleteriously affecting the efficiency of the sterilization. The coating phenomena is believed due to the development of a positive charge on the exposed surface on the lamp due to the radiation from the arc inside the lamp.

Colloidal matter in most naturally occurring waters is negatively charged and therefore becomes strongly attracted to the positively charged surface of the glass tube of the ultraviolet lamp and in time accumulating and forming a coating thereon. It is also common in the prior art to insulate the ultraviolet lamp from the surrounding water by inserting said lamp in a loosely fitted heavy quartz jacket for the purpose of maintaining the radiation arc at a higher temperature, thereby improving the conversion efficiency. It was also found that such a protective quartz jacket became similarly coated with colloidal slime matter, presumably by the same mechanism. Low ambient temperatures are a factor in reducing the lamp intensity and the quartz jacket is often desirable to protect the lamp from the excessive cooling effects of the flowing water around and in contact with the lamp. In such a case, it is also necessary to prevent colloidal matter in the water from coating the outer surface of the quartz jacket which coating would otherwise shield or absorb the ultraviolet radiation preventing the proper lethal doses from reaching the water to be sterilized. The present invention is equally applicable in this situation, as well as that of preventing the coating of the quartz surface of the lamp itself. The recognition of the deleterious effects of the colloidal particle coating of the water-contact surface of the lamp or surrounding quartz jacket is amply emphasized by the published policy statement of the Department of Health, Education, and Welfare, Public Health Service, that the commercial ultraviolet "unit shall be designed to permit frequent mechanical cleaning of the water-contact surface of the jacket without disassembly of the unit." The present invention is designed to obviate the necessity of mechanical cleaning of the outside surface of the ultraviolet tube or jacket by eliminating the coating of the same with the colloidal particles present in most waters to be sterilized.

In more recent ultraviolet sterilizers, mechanical wipers are included in their design to periodically wash and wipe off the colloidal coating matter. Such wipers are operated manually in smaller low-cost sterilizers and automatically in the more expensive larger sterilizers. It is apparent that in either case the sterilization efficiency decreases between cleanings due to attenuation by the slime. In addition, the use of such wipers necessitates the use of heavier quartz tubes in order to withstand the mechanical stresses of wiping, and in most commercial devices the tubes themselves, especially the heavier tubes, will absorb approximately 25% of the effective radiation from the arc. As a result of the sliming problem, the universal acceptance of ultraviolet sterilizers for water is lacking. While the use of filters before sterilization decreases the frequency of cleaning the lamp surface, this pretreatment proved not to be completely efficient and accordingly mechanical wipers were found necessary.

An object of the present invention is to provide a device and method of sterilization of aqueous liquids by the use of an ultraviolet lamp which eliminates the need of mechanical wipers to remove colloidal matter which deposits on the outside surface of an ultraviolet lamp.

Another object of the invention is to prevent the coating of colloidal matter on the surface of an ultraviolet lamp in the sterilization of water.

Another object of the invention is to increase the efficiency of ultraviolet sterilization of liquids.

Other objects, features and advantages of this invention will in part become obvious and will in part become apparent from the following disclosure taken in connection with the schematic drawing in which:

A hot cathode, low pressure ultraviolet mercury arc lamp 1 is positioned at or near the axis of a hollow container 2 (preferably cylindrical in shape) which defines a water chamber 3 located between the outer wall of the lamp 1 and the inner wall of container 2. Water chamber 3 is provided with inlet 4 and outlet 5 for flowing through said chamber the water which is to be sterilized by radiation from the ultraviolet lamp. Lamp 1, which extends at both its ends a short distance beyond the container, made for example of Lucite, is provided on one end with a removable cap 6 screw-threaded to the container 2 with gasket seals 6a and 6b. The extended end 10 of cap 6 is threaded to receive a lamp-water chamber sealing device 7 having clamping nut 9 with a rubber O-ring 8 as the water-sealing gasket between the lamp and the container. At the other end, the container is provided with an end cap 11 which is shown as fixed but obviously could be made removable if desired in the same manner as the end cap 6. The purpose of removable cap 6 is to provide the facility of servicing the inside of the container 2 as found necessary. The lamp-water chamber sealing device 7a is identical to that of device 7 on the other end as described above.

At the inner wall surface of container 2 there is placed an electrically conducting sheet or grid 12 of, for example, graphite or expanded titanium which functions as an anode by virtue of a secured anode screw-threaded bolt 13 connected to the positive pole of a high voltage direct current source 15 by line 14 through the wall of said container. Hot cathode connections 16 and 17 are connected from each end of the ultraviolet lamp tube 1 to ballast 18 which in turn is connected to its source of alternating current as at 19 (not shown in detail). The superimposed direct current circuit of anode grid 12 is completed by line 20 which is tapped to one of the lines 16 at 21 and which feeds electric current to the direct current source 15. The direct current passes from the arc of plasma in the lamp through the outer wall of said lamp, through the surrounding water in chamber 3, to anode 12, and then back to the positive pole of the direct current source 15.

In the above described device, a negative charge on the outside wall of the lamp is effected by the passage of a direct current measured in microamperes at an attainable voltage from the arc of the ultraviolet lamp to its outer wall, then through the surrounding water to the external anode. Accordingly, the negatively charged colloidal particles in the water are electrically attracted to the external anode grid where they tend to form a coating thereon leaving the quartz surface of the lamp unaffected by the colloidal particles of the surrounding water. It is found that a current density of less than 1 milliampere per square decimeter of tube wall is sufficient to maintain a clean surface.

The following example is presented illustrating the operation of this invention in the sterilization of water by the ultraviolet light radiation and is not to be construed as necessarily limiting thereto.

EXAMPLE

A 25 watt hot cathode low-pressure mercury arc lamp was encased in a cylindrical container as shown in the drawing wherein the cylinder was approximately 4″ in diameter and about 2″ shorter in length than the lamp. A sheet of expanded titanium was used as an anode grid. The grid was also in the form of a cylinder and was placed at the inner wall of the container. Tap water having a high colloidal content, particularly in the form of iron oxide, was passed at about ½ gallon per minute through the annulus which corresponds to the area between the inner wall of the container and the outer wall of the ultraviolet lamp. The thickness of the water layer flowing through the device around and in contact with the lamp was approximately 2″. The lamp was started in the usual manner and then a high voltage direct current of about 2,000 volts was applied whereby a current of about 5 microamperes resulted in the superimposed direct current through the quartz walls of the ultraviolet lamp. After operating for a period of five months, the device was dismantled and it was found that the external wall of the lamp remained substantially clean and free of colloidal matter over this test period.

As a test control, a commercial sterilizer containing a 25 watt ultraviolet lamp was operated under the same conditions and time period noted above. The device was provided with a manual wiper but in order to allow for a true comparison the wiper was not used during the test. After about five months' operation, it was found that the tube was covered with a heavy iron slime of sufficient thickness to drastically attenuate the radiation and change the color of the radiation from blue to green.

Although the process and apparatus have been particularly described with respect to the hot cathode, low-pressure mercury arc lamp, it is equally applicable to the cold cathode, low-pressure mercury arc lamp, the high-pressure mercury arc lamp, the xenon arc lamp, the hydrogen arc lamp, the incandescent ultraviolet lamp and all other electrically powered ultraviolet lamps in which the ultraviolet radiation is emitted from a medium maintained during radiation at an elevated temperature.

We claim:

1. A device for ultraviolet light sterilization of an aqueous liquid in contact with the outside surface of an electrically powered ultraviolet lamp comprising: means for flowing said aqueous liquid in a stream less than 3″ thickness in contact with said lamp, an electrode located in said liquid external to and out of direct physical contact with the oustide surface of said lamp, and means for passing a direct electric current between the radiating media of said lamp and said electrode through the surface of said lamp to prevent sliming of the outside surface of said lamp.

2. The device of claim 1 wherein the said lamp and electrode are located within a container of substantially cylindrical shape with the lamp situated substantially along the axis thereof.

3. The device of claim 1 wherein the outside surface of the lamp is negatively charged.

4. The device of claim 1 wherein the potential of the direct electric current is in the range of 1,000 to 2,000 volts and the direct current is less than 1 milliampere per square decimeter.

5. The device of claim 1 wherein said electrode is in the form of a grid of expanded titanium.

6. The device of claim 1 wherein said electrode is of a substantially cylindrical form.

7. A device for the prevention of slime coating of the outer surface of an ultraviolet radiation tube in the sterilization of water comprising: a hollow cylindrical container provided with a low-pressure mercury arc lamp positioned substantially along the axis of said cylinder, said lamp being spaced from the walls of said cylinder to define a liquid region between said sylinder and said arc lamp, inlet and outlet means in said container for passing a liquid through said region in contact with the outer surface of said arc lamp, means for electrically energizing said lamp, an electrically conducting electrode located external to said lamp and substantially adjacent to the inner wall of said cylindrical container, means for maintaining said electrode as an anode, and means for passing a high voltage, low amperage direct electric current between the arc of the lamp and the electrode, whereby the outer surface of the lamp is negatively charged thereby causing the colloidal articles in the water being sterilized to be deposited at least in part on the external anode, the outer surface of the arc lamp remaining substantially free from slime.

8. The method of sterilizing an aqueous liquid by ultraviolet radiation from a low-pressure mercury arc lamp in contact therewith wherein the improvement comprises impressing a high-voltage, low-amperage direct electric current through the walls of said lamp to an electrode located in said liquid external to and out of direct physical contact with outside surface of said lamp whereby sliming of the outside walls of said lamp is prevented.

9. The method of claim 8 wherein the voltage is about 2,000 volts and the amperage is less than 1 milliampere per square decimeter.

10. The method of preventing sliming of the outside surface of a low-pressure mercury arc ultraviolet sterilizer lamp comprising passing water to be sterilized through a container having said lamp substantially centrally located therein defining the flow path of said water between the lamp and the walls of said container, said container being provided with an anode adjacent to its inner walls, maintaining a negative charge on the walls of said lamp by passing a direct electric current from the anode through the water and through the walls of the lamp to the electric arc of the lamp whereby sliming of the outside surface of the lamp is eliminated.

11. The method of claim 10 wherein the water is clarified prior to passage into said container.

References Cited

UNITED STATES PATENTS

| | | |
|---|---|---|
| 2,588,716 | 3/1952 | Gochenour et al. |
| 2,670,439 | 2/1954 | Darney _____ 250—43 |
| 3,061,721 | 10/1962 | Brenner. |
| 3,182,191 | 5/1965 | McFarland et al. _____ 250—43 |
| 3,182,193 | 5/1965 | Ellner et al. |

OTHER REFERENCES

Hutchinson, C. O.: Electrocoating—A Modern Painting Method; Plating, November 1965, vol. 52, No. 11, (pages 1133–1137 relied on), copy available in Class 204, Subclass 180.

Mrkovitch, V., Bioelectric Phenomena, Thrombosis and Plastics: A Review of Current Knowledge, Cleveland Clinic Quarterly, vol. 30, October 1963, pages 241–252 relied on.

MORRIS O. WOLK, Primary Examiner

BARRY S. RICHMAN, Assistant Examiner

U.S. Cl. X.R.

21—102; 204—180, 186; 250—43